Jan. 21, 1936.  K. TESSKY  2,028,362

AUTOMATIC LATHE

Filed Nov. 29, 1933

Inventor
Karl Tessky
by Kachkeshaung
Atty.

Patented Jan. 21, 1936

2,028,362

UNITED STATES PATENT OFFICE 2,028,362

AUTOMATIC LATHE

Karl Tessky, Esslingen, Germany

Application November 29, 1933, Serial No. 700,284
In Germany December 10, 1932

4 Claims. (Cl. 29—53)

My invention relates to automatic lathes and more especially to the friction clutches forming part of such lathes. It is an object of my invention to prevent overheating of these clutches. To this end, I provide on one of the parts constituting the clutch helical ribs for effecting a flow of the ambient air whereby this part is cooled.

The clutches with friction cones provided for reversing the lathe spindle when cutting threads are frequently thrown in and out, and the tendency to increase the output of the lathes, together with the general improvements in the art, requires more and more frequent operation of the clutches. This results in a corresponding production of frictional heat, and finally in temperatures which are so elevated as to interfere with the operation of the machine. Thus, the overheating of the clutches deteriorates the lubricant in the bearings of the friction cones, or in other bearings in the vicinity, and causes heat-expansion and warping of parts of the lathe, particularly of its head stock and bed, by local heating. Such deformation is unfavorable with respect to the required accuracy of the parts which are tooled.

My invention provides means for eliminating these drawbacks in a simple and efficient manner, and without introducing sources of troubles of other kind.

In the drawing affixed to this specification and forming part thereof, an automatic lathe embodying my invention is illustrated diagrammatically by way of example.

In the drawing

Figure 1:
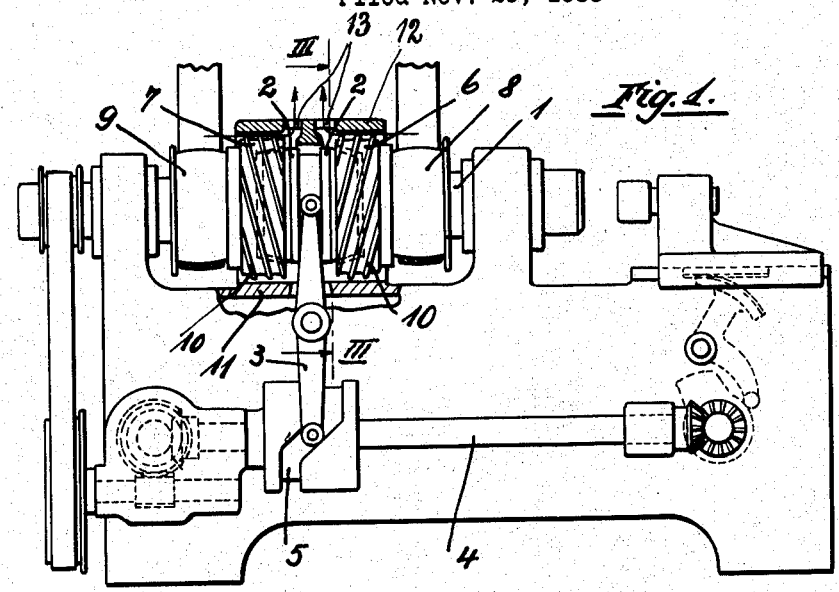
Fig. 1 is a partly sectional elevation of an automatic lathe.
Figure 3:
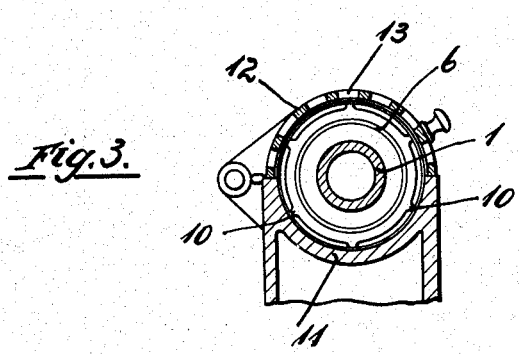
Fig. 3 is a section on the line III—III in Fig. 1.

Referring now to the drawing, and first to Figs. 1 and 3, the details of this automatic lathe will not be described as they have no bearing on my invention. 1 is the spindle of the lathe which is mounted to rotate in suitable bearings on the lathe bed. Mounted to slide axially on the spindle 1 but held against rotation with respect to the spindle, is a twin friction cone with two male members 2, 2 and 3 is a double-armed lever which is fulcrumed on the lathe bed. One end of the lever 3 engages in a groove of the twin friction cone, and the other end is operated by a camming groove 5 in a cylinder on the control shaft 4. The friction cone is reciprocated as the shaft 4 rotates.

6 and 7 are female friction cones for cooperation with the cones or male members 2, 2. The cone 6 is connected to a pulley 8, and the cone 7 is connected to a pulley 9. Both pulleys are mounted to rotate freely on the spindle 1 but rotate in opposite directions.

According to my invention, the two female cones 6 and 7 are equipped with means, here shown as helical ribs 10, for effecting a flow of the ambient air with respect to the corresponding cone. The flowing air, as indicated by the arrows in Fig. 1, moves along the surface of the corresponding cone in parallel relation to its axis and, as the helical ribs 10 on the individual cones have opposite hands, the air flows toward the inner ends of the two cones where it is deflected tangentially.

Preferably, a casing is provided which surrounds the helical ribs 10 in spaced relation thereto, and is fixed. By these means the cooling action of the flowing air is intensified. The casing is preferably built up from two semi-cylindrical shells 11 and 12, Fig. 3. The lower shell 11 is integral with the lathe bed, and the upper shell 12 is hinged to the lower shell at one side so as to form a lid which is adapted to be raised. Openings 13 in the central zone of the upper shell 12 permit the heated air to escape.

Figure 2:
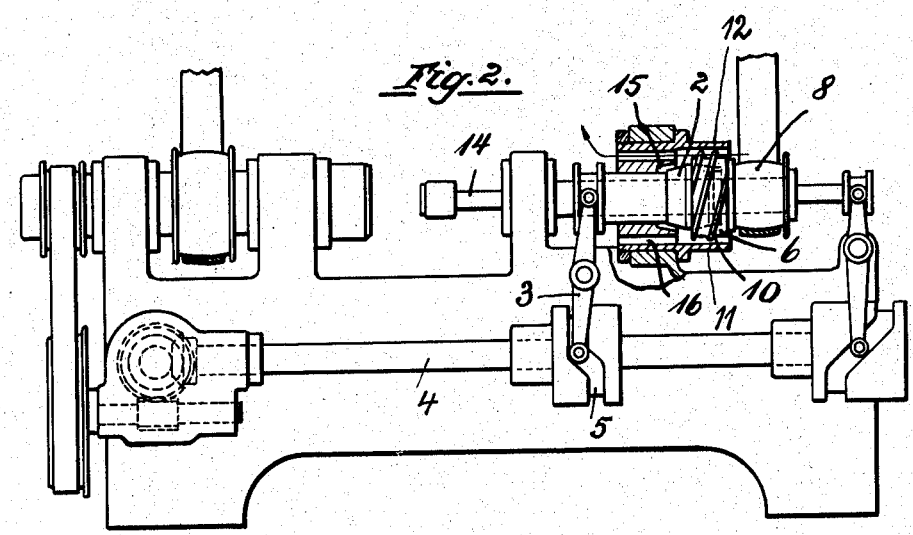
Fig. 2 is a similar view of a thread-cutting lathe, both provided with a friction clutch embodying my invention.

Referring now to Fig. 2, this thread-cutting lathe, like the automatic lathe in Figs. 1 and 3, will not be described in detail. 14 is its spindle on which the twin friction cone with its two male members 2 is mounted to be displaced by the means described with reference to Fig. 1. In this lathe, however, only the pulley 8 is provided and connected to the female cone 6, as described with reference to Figs. 1 and 3, the other female cone 7, with its pulley 9, being replaced by a fixed female cone 15 which is mounted in the lathe bed. 16 are air passages or ducts in the fixed female cone 15.

Only the rotary part or female cone 6 is equipped with the means or ribs 10, as described for both cones 6 and 7 in Fig. 1, and the ribs have a double function here, since they not only establish a flow of air along the cone 6 but also through the ducts 16 of the fixed cone, so that both the rotary and the fixed female cone are cooled efficiently.

My invention has been illustrated for two types of lathes only with a view to demonstrating its adaptability. Obviously, the possibilities of my invention are not exhausted by these two examples.

I wish it to be understood that I do not desire to be limited to the exact details of construction shown and described, for obvious modifications will occur to a person skilled in the art.

I claim:

1. An automatic lathe comprising in combination, a lathe bed, a lathe spindle revoluble on said bed and a pair of revoluble clutching parts surrounding said spindle and forming a friction clutch, a helical rib formed on one of said revoluble clutching parts being arranged to effect a flow of the ambient air with respect to said parts.

2. An automatic lathe comprising in combination, a lathe bed, a lathe spindle revoluble on said bed and a pair of revoluble clutching parts surrounding said spindle and forming a friction clutch, a helical rib formed on one of said revoluble clutching parts being arranged to effect a flow of the ambient air with respect to said parts and a stationary casing surrounding said ribbed part in spaced relation.

3. An automatic lathe comprising in combination, a lathe bed, a lathe spindle revoluble on said bed and a pair of revoluble clutching parts surrounding said spindle and forming a friction clutch, a helical rib formed on one of said revoluble clutching parts being arranged to effect a flow of the ambient air with respect to said parts, and an apertured stationary casing surrounding said ribbed part in spaced relation.

4. An automatic lathe comprising in combination, a lathe bed, a lathe spindle revoluble on said bed and a pair of revoluble clutching parts, and another stationary clutching part, surrounding said spindle and forming a friction clutch, a helical rib formed on one of said revoluble clutching parts being arranged to effect a flow of the ambient air with respect to said stationary part.

KARL TESSKY.